US010071636B2

(12) United States Patent
Dremel et al.

(10) Patent No.: US 10,071,636 B2
(45) Date of Patent: Sep. 11, 2018

(54) CONTROL DEVICE FOR A MULTI-VOLTAGE VEHICLE ELECTRICAL SYSTEM

(71) Applicant: Brose Fahrzeugteile GmbH & Co. Kommanditgesellschaft, Hallstadt, Hallstadt (DE)

(72) Inventors: Benedikt Dremel, Stegaurach (DE); Anto Mijac, Bamberg (DE)

(73) Assignee: Brose Fahrzeugteile GmbH & Co., Hallstadt (DE)

( * ) Notice: Subject to any disclaimer, the term of this patent is extended or adjusted under 35 U.S.C. 154(b) by 275 days.

(21) Appl. No.: 15/010,861

(22) Filed: Jan. 29, 2016

(65) Prior Publication Data

US 2016/0221452 A1 Aug. 4, 2016

(30) Foreign Application Priority Data

Feb. 3, 2015 (DE) .................... 10 2015 201 869

(51) Int. Cl.
*H02J 7/34* (2006.01)
*B60L 11/18* (2006.01)
(Continued)

(52) U.S. Cl.
CPC ......... *B60L 11/1803* (2013.01); *B60L 3/0069* (2013.01); *H02J 7/1423* (2013.01); *H02J 7/34* (2013.01)

(58) Field of Classification Search
CPC .................................. H02J 7/1423; H02J 7/34
See application file for complete search history.

(56) References Cited

U.S. PATENT DOCUMENTS 5,796,175 A 8/1998 Itoh et al.
6,438,462 B1 * 8/2002 Hanf .................... G06F 1/3203
340/693.4
(Continued)

FOREIGN PATENT DOCUMENTS

DE 199 21 451 C1 11/2000
DE 103 30 703 A1 1/2005
(Continued)

OTHER PUBLICATIONS

Philips Semiconductors, Application Note AN00093, TJA1020 LIN transceiver, Rev. 02, Sep. 16, 2005 (44 pages).
(Continued)

*Primary Examiner* — Thienvu Tran
*Assistant Examiner* — Pinping Sun
(74) *Attorney, Agent, or Firm* — Lewis Roca Rothgerber Christie LLP

(57) ABSTRACT

A control device for a multi-voltage electrical system of a vehicle is provided. The multi-voltage vehicle electrical system includes a first subsystem which is formed to be operated by a first voltage supply source with a first supply voltage, and a second subsystem which is formed to be operated by a second voltage supply source with a second supply voltage. The control device comprises: a transceiver which is connected to ground via a first ground terminal of the first subsystem and is supplied with energy at least by the first voltage supply source, and which is formed to communicate with a component of the first subsystem; a control unit which is connected to ground via a second ground terminal of the second subsystem, and which is formed to control a component of the second subsystem. The control unit is supplied with energy at least by the first voltage supply source.

15 Claims, 2 Drawing Sheets

(51) Int. Cl.
*B60L 3/00* (2006.01)
*H02J 7/14* (2006.01)

(56) References Cited

U.S. PATENT DOCUMENTS

| | | | |
|---|---|---|---|
| 6,455,949 B1 | 9/2002 | Blauensteiner et al. | |
| 7,180,205 B2* | 2/2007 | Wirdel | B60L 3/003 |
| | | | 307/10.1 |
| 7,741,960 B1* | 6/2010 | Hoogenakker | B60T 13/662 |
| | | | 340/12.32 |
| 8,653,853 B1* | 2/2014 | Shumarayev | H03K 19/0175 |
| | | | 326/30 |
| 2005/0035656 A1* | 2/2005 | Kuramochi | H02J 1/08 |
| | | | 307/10.1 |
| 2007/0262649 A1 | 11/2007 | Ozawa et al. | |
| 2010/0001523 A1 | 1/2010 | Sato et al. | |
| 2011/0264326 A1 | 10/2011 | Iwasaki | |
| 2012/0280573 A1* | 11/2012 | Ohkura | H02J 7/0016 |
| | | | 307/80 |
| 2014/0005881 A1* | 1/2014 | Hardesty | F02D 41/22 |
| | | | 701/32.8 |
| 2015/0130469 A1* | 5/2015 | Bolduc | G01R 31/362 |
| | | | 324/426 |

FOREIGN PATENT DOCUMENTS

| | | | | |
|---|---|---|---|---|
| DE | 11 2008 002 240 B4 | 10/2014 | | |
| DE | 10 2013 012 615 A1 | 1/2015 | | |
| DE | 10 2014 010 371 A1 | 1/2015 | | |
| DE | 10 2014 221 672 A1 | 4/2016 | | |
| DE | 102014221672 A1 * | 4/2016 | | B60R 16/023 |
| DE | 10 2015 201 572 A1 | 8/2016 | | |
| EP | 1 302 371 A2 | 4/2003 | | |
| EP | 1302371 A2 * | 4/2003 | | B60T 8/885 |
| EP | 1 646 522 B1 | 12/2007 | | |
| WO | WO 2015/011212 A1 | 1/2015 | | |
| WO | WO 2016/062580 A1 | 4/2016 | | |

OTHER PUBLICATIONS

European Search Report dated Jun. 7, 2016, Application No. 16152856.7-1804, 9 pages.

* cited by examiner

CONTROL DEVICE FOR A MULTI-VOLTAGE VEHICLE ELECTRICAL SYSTEM

CROSS-REFERENCE TO RELATED APPLICATION

This application claims priority to German Patent Application No. 10 2015 201 869.5 filed on Feb. 3, 2015, the entirety of which is incorporated by reference herein.

BACKGROUND

The present invention relates to a control device for a multi-voltage electrical system of a vehicle. Furthermore, the present invention relates to a control device for a multi-voltage electrical system of a vehicle.

Occasionally, a vehicle such as a passenger car, a truck, a train etc. is equipped with a multi-voltage electrical system. The multi-voltage vehicle electrical system at least comprises a first subsystem and a second subsystem. The first subsystem is formed to be operated by a first voltage supply source with a first supply voltage, for example 12 V. The second subsystem is formed to be operated by a second voltage supply source with a second supply voltage, for example 48 V.

In such multi-voltage vehicle electrical system, there is occasionally used a control device which can be coupled both to the first subsystem and to the second subsystem. Within the control device both voltage levels of the two subsystems hence are present.

For example, such control device comprises a transceiver which via a first ground terminal is connected to ground, for example vehicle ground, and which is formed to communicate with a communication component of the first subsystem. For example, such transceiver comprises a so-called Local Interconnect Network (LIN) transceiver.

In addition, such control device can comprise a control unit which via a second ground terminal of the second subsystem is connected to ground, for example vehicle ground, and which is formed to control a power component of the second subsystem.

Because, as said, several voltage levels can be present in such control device, it can be required that certain components of the control device have a dielectric strength which takes account of the higher of the two voltage levels. Furthermore, due to the coupling between the two subsystems HF interferences of the one subsystem can be transmitted into the other subsystem.

SUMMARY

In the control device of a first aspect, the control unit is supplied with energy at least also by the first voltage supply source. For example, the control unit is supplied with energy exclusively by the first voltage supply source. In one embodiment, the transceiver and the control unit hence simultaneously are supplied with energy by the first voltage supply source.

In this way, less expensive components with lower dielectric strength can be used. In addition, the control unit also can operate when the second voltage supply source of the second subsystem is switched off or defective.

The control device of a second aspect comprises a first supply contact for receiving the first supply voltage, a second supply contact for receiving the second supply voltage, a first ground contact which is connected with the first ground terminal, and a second ground contact which is connected with the second ground terminal. In addition, the control device comprises a filter device, wherein the filter device is connected to the first supply contact via a filter voltage terminal and is connected to the second ground contact via a filter ground terminal. Alternatively, the filter device is connected to the second supply contact via the filter voltage terminal and is connected to the first ground contact via a filter ground terminal.

The filter device, which for example is formed as low-pass filter, forms a filtering coupling between the two subsystems. The EMC properties of the control device hence are improved, so that for example parts of smaller dimensions and components for the control device can be used.

The features of the control device of the first aspect and the control device of the second aspect can be combined with each other. In the following, further optional features of the control devices of the first and the second aspect will be explained. These features can be provided both in the control device of the first aspect and in the control device of the second aspect, unless this is excluded expressly. Therefore, reference always will be made to "the control device", which can be both the control device of the first aspect and/or the control device of the second aspect.

In one embodiment of the control device, the control unit comprises a microcontroller. For example, the control unit is formed to control a power component of the second subsystem, such as a driver for an inverter, an inverter and/or an electric motor. For example, the driver, the inverter and/or the electric motor are supplied with energy by the second voltage supply source. In dependence on driver output signals, the inverter for example converts the second supply voltage into an output alternating voltage which is supplied to the motor.

The transceiver for example comprises a LIN transceiver. The transceiver can be formed to communicate with a communication component of the first subsystem, for example a LIN communication component arranged outside the control device.

For example, the second supply voltage is greater than the first supply voltage. The first voltage supply source can be a battery which provides a DC voltage, for example a DC voltage of about 12 V. Instead of the battery, another voltage supply source, such as for example a power-electronic rectifier, also can be provided. The second voltage supply source for example is a second battery which provides the second supply voltage, for example a second supply voltage of about 48 V. Instead of the second battery, there can also be provided another means which produces the second supply voltage, for example a further power-electronic rectifier.

The two ground terminals are arranged e.g. separate from each other. The ground terminals for example can be ground studs. Both ground terminals, however, can be connected to one and the same common ground, for example vehicle ground, which can be formed by the vehicle body. The two ground terminals in particular can be located outside the control device.

The control device can include a first ground contact which is connected with the first ground terminal and a second ground contact which is connected with the second ground terminal. These two ground contacts for example are arranged on a housing of the control device. In other words, the first ground contact receives the potential of the first ground terminal, and the second ground contact receives the potential of the second ground terminal. Since the two ground terminals can be arranged separate from each other, they do not necessarily always have exactly the same potential.

For receiving the first supply voltage and for receiving the second supply voltage corresponding supply contacts can be provided in the control device, of which a first supply contact is connected with the first voltage supply source and a second supply contact is connected with the second voltage supply source. In other words, the first supply contact receives the first supply voltage and the second supply contact receives the second supply voltage. Instead of the supply voltages themselves produced by the voltage supply source, supply voltages derived therefrom also can be received, which for example are produced by voltage converters upstream of the control device. Hence, in one embodiment the energy supply of the first voltage supply source is effected via the first supply contact and the energy supply of the second voltage supply source is effected via the second supply contact of the control device.

The control unit of the control device can comprise a first ground port which is connected to the second ground terminal. Such electrical connection in particular can comprise the second ground contact of the control device.

Furthermore, the control unit of the control device can comprise a first supply port which can be connected with the first voltage supply source via a first supply path. This connection in particular can comprise the first supply contact of the control device. By means of the first supply path, energy of the first voltage supply source hence is provided to the control unit of the control device.

In a similar way, the transceiver can comprise a second ground port which is connected to the first ground terminal. Such electrical connection in particular can comprise said first ground contact of the control device. Furthermore, the transceiver of the control device can comprise a second supply port which can likewise be connected with the first voltage supply source via a further supply path. This connection in particular likewise can comprise the first supply contact of the control device.

Within the first supply path, via which the supply of the control unit is effected, a voltage converter can be provided, which is formed to receive the first supply voltage and convert the same into an operating voltage for the control unit and provide this operating voltage at the first supply port of the control unit. For example, the voltage converter converts the first supply voltage of e.g. 12 V into the operating voltage of e.g. 5 V or 3.3 V. i.e. into a voltage which is suitable for a microcontroller. In particular, the voltage converter can be connected to the second ground terminal. Such electrical connection in particular can effect the second ground contact of the control device. The voltage converter for example is a DC voltage converter.

In a further embodiment, the first supply path comprises a diode. For example, the diode is arranged in the first supply path such that an anode terminal of the diode receives the first supply voltage.

For example, in addition to the diode said voltage converter is provided, which for example is arranged downstream of the diode. An input of the voltage converter for example can be connected with a cathode terminal of the diode and an output of the voltage converter can be connected with the first supply port of the control unit.

In a further embodiment a separating device is provided in the first supply path, wherein the separating device is formed to block a current flow in the first supply path at least in one flow direction. In this way it can be prevented that via the first supply path energy flows into the first subsystem, whereby the robustness of the control device in effect can be increased. In particular it can be provided that the separating device comprises said diode or is formed by the diode. Instead of the diode, however, another, different type of separating device can be provided, for example a galvanic separation or the like. The diode, however, has the advantage that the same already is formed to block the current flow in the first supply path in the at least one flow direction.

In another embodiment of the control device of the first aspect said filter device additionally is provided, wherein the filter device either is connected to the first supply contact via a filter voltage terminal and to the second ground contact via a filter ground terminal or is connected to the second supply contact via the filter voltage terminal and to the first ground contact via the filter ground terminal.

The filter device, which selectively can be installed inside and/or outside the control device, creates a filtering coupling between the first subsystem and the second subsystem, which can attenuate high-frequency interferences, subsequently referred to as HF interferences, between the first subsystem and the second subsystem, in particular those which have been induced by a HF source of the control device. Such HF source in particular can be formed by the control unit itself, by said driver, said inverter and/or said electric motor.

In one embodiment, the filter device is formed as low-pass filter which attenuates frequencies above 100 kHz, for example above 150 kHz.

For example, the filter device comprises a capacitor, wherein a first electrode terminal of the capacitor can be connected to the first supply contact of the control device, and wherein a second electrode terminal of the capacitor can be connected to the second ground contact of the control device. Furthermore a coil can be provided, which for example is connected in series to the capacitor.

BRIEF DESCRIPTION OF THE DRAWINGS

Further features and advantages of the invention will become apparent from the following description of exemplary embodiments with reference to the Figures.

DETAILED DESCRIPTION

Figure 1:
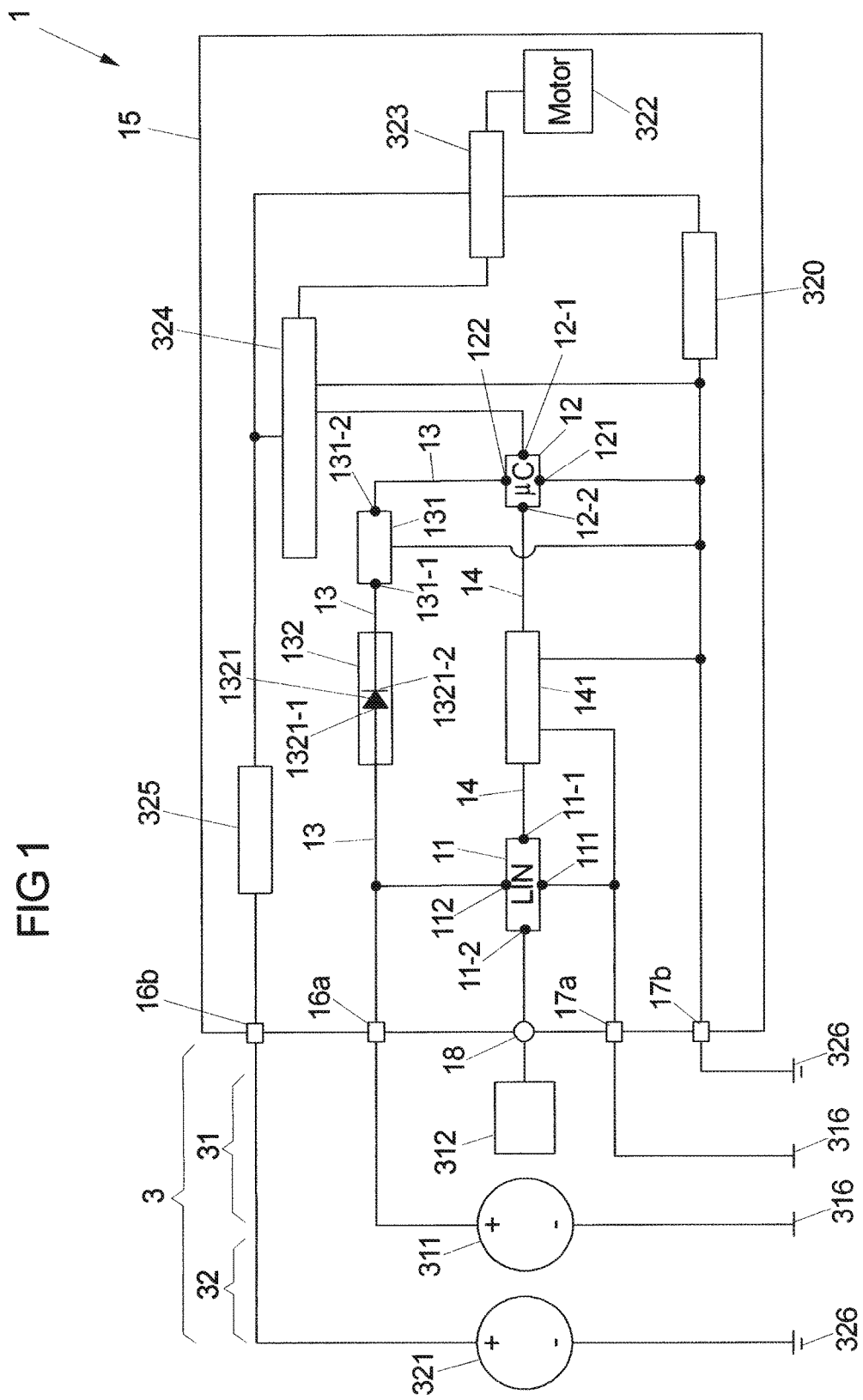
FIG. 1 shows a schematic and exemplary representation of a part of a multi-voltage vehicle electrical system with a control device according to one or more embodiments.
Figure 2:
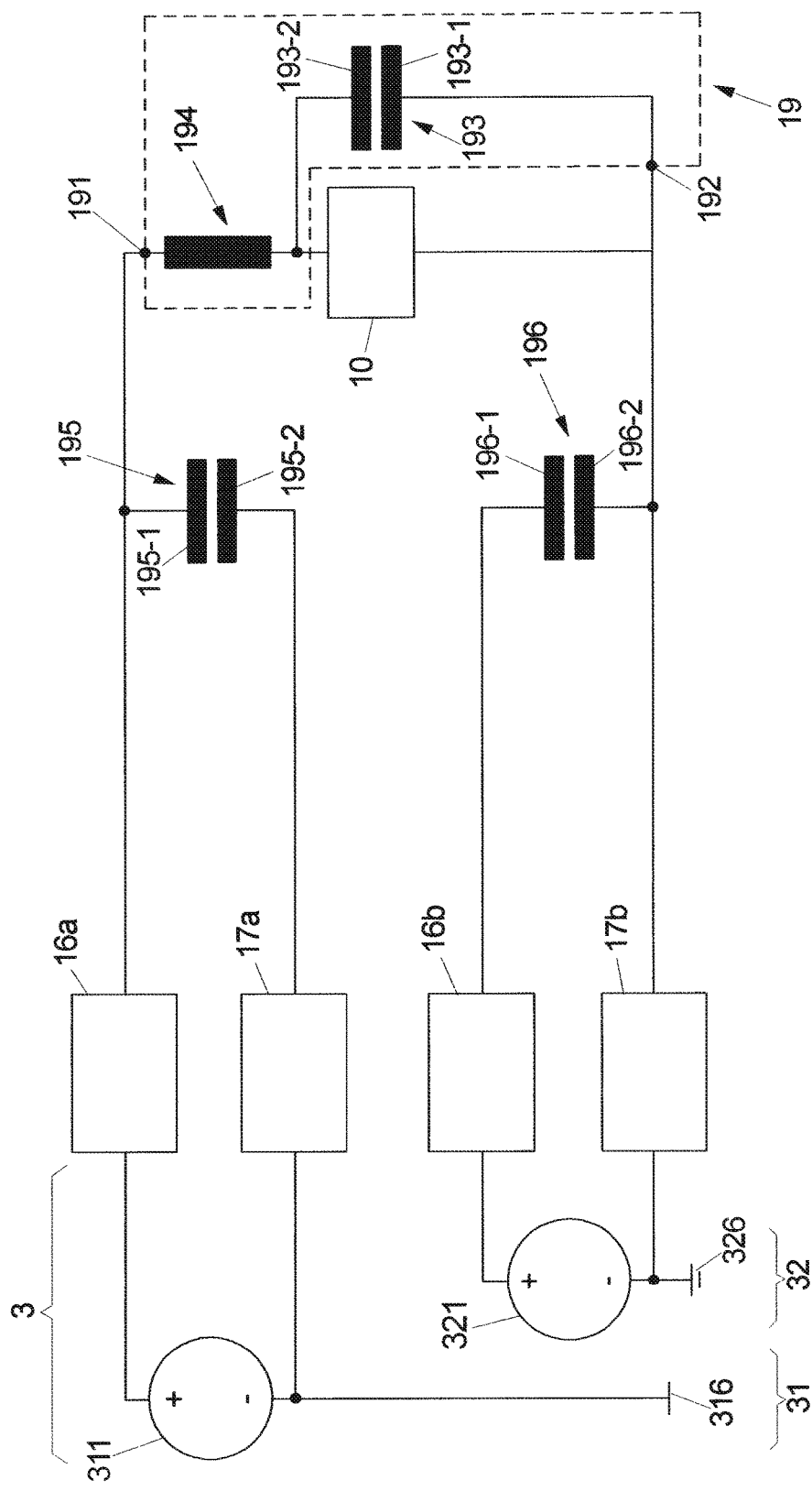
FIG. 2 shows a schematic and exemplary representation of a part of a multi-voltage vehicle electrical system with parts of a control device according to one or more embodiments.

FIG. 1 shows a schematic and exemplary representation of a part of a multi-voltage vehicle electrical system 3 with a control device 1 according to one or more embodiments, and FIG. 2 likewise shows a schematic and exemplary representation of a part of a multi-voltage vehicle electrical system 3 with parts of a control device 1 according to one or more embodiments. In the following, reference will be made both to FIG. 1 and to FIG. 2.

The multi-voltage vehicle electrical system 3 comprises at least a first subsystem 31 and a second subsystem 32. The first subsystem 31 is formed to be operated by a first voltage supply source 311. The second subsystem 32 is formed to be operated by a second voltage supply source 321.

The first voltage supply source 311 for example provides a direct voltage, for example a direct voltage of 12 V. The second voltage supply source 321 for example likewise provides a direct voltage, for example a direct voltage of 48 V.

The first voltage supply source 311 for example can comprise a battery and/or a power-electronic rectifier. The second voltage supply source 321 likewise can comprise a battery and/or a further power-electronic rectifier.

The first voltage supply source 311 is connected to ground via a first ground terminal 316, for example vehicle ground (not shown in the Figures). The second voltage supply source 321 is connected to the same ground via a second ground terminal 326, which can be arranged separate from the first ground terminal 316. For example, the two ground terminals 316 and 326 comprise corresponding ground studs.

Some components of the control device 1 for example are integrated within a housing 15 of the control device 1. The control device 1 comprises the following contacts, which for example are arranged on the housing 15: a first ground contact 17a which is connected to the first ground terminal 316, a second ground contact which is connected to the second ground terminal 326, a first supply contact 16a which is connected with the first voltage supply source 311, and a second supply contact 16b which is connected with the second voltage supply source 321. Furthermore, a number of communication signal contacts 18 can be provided, which are connected with a communication component 312 of the first subsystem 31.

The communication component 312 of the first subsystem for example can be a LIN communication component. This communication component 312 for example provides communication signals corresponding to the LIN standard.

The control device 1 comprises a transceiver 11 and a control unit 12, which both can be arranged within the housing 15.

The transceiver 11 is formed to communicate with the communication component 312 of the first subsystem 31. For example, the transceiver 11 for this purpose is connected with the communication component 312 via the number of communication signal contacts 18. For example, the transceiver 11 receives said communication signals via a first signal input 11-2. The transceiver 11 thus can be associated to the first subsystem 31.

The transceiver 11 can comprise a LIN transceiver. In particular, the transceiver 11 can be a LIN transceiver.

Via a second supply port 112, e.g. a pin of a LIN transceiver, the transceiver 11 receives the first supply voltage which is provided by the first voltage supply source 311, or a voltage derived therefrom. The corresponding supply path, which connects the second supply port 112 of the transceiver 11 with the first voltage supply source 311, includes the first supply contact 16a of the control device 1. On the other hand, the transceiver 11 is connected to the first ground terminal 316 via a second ground port 111, e.g. a further pin of a LIN transceiver. The corresponding line path in particular includes the first ground contact 17a.

The control unit 12 is operatively coupled to the transceiver 11 and is formed to control a power component of the second subsystem 32. This power component of the second subsystem 32 can comprise a motor 322, an inverter 323 and/or a driver 324. Said power components 322, 323 and 324 can be arranged inside the housing 15 of the control device 1 or outside of the same. These power components are supplied with energy in particular by the second voltage supply source 321 and are associated to the second subsystem 32.

The coupling between the transceiver 11 and the control unit 12 can comprise a control signal path 14 via which a control signal can be transmitted from a first signal output 11-1 of the transceiver to a second signal input 12-2 of the control unit. The control signal path 14 will be discussed in detail at a later point.

The control unit 12 can comprise a microcontroller (µC). In particular, the control unit 12 can be a microcontroller.

The first signal output 11-1 of the transceiver 11 for example comprises a pin of a LIN transceiver and the second signal input 12-2 of the control unit 12 for example comprises a pin of a microcontroller.

On the one hand, the control unit 12 is connected to the second ground terminal 326 via a first ground port 121, e.g. a pin of a microcontroller. The corresponding connecting line between the control unit 12 and the second ground terminal 326 in particular includes said second ground contact 17b of the control device 1. On the other hand it is provided that the control unit 12 is supplied with energy at least by the first voltage supply source 311. For these purposes, for example a first supply path 13 is provided, which connects a first supply port 122 of the control unit 12, e.g. a further pin of a microcontroller, with the first voltage supply source 311. In particular, the first supply path 13 can be connected with the first voltage source 311 by means of the first supply contact 16a.

The first supply path 13 can comprise a separating device 132, which is formed to block a current flow in the first supply path 13 at least in one flow direction. In particular, the separating device 132 is formed to prevent that current flows from the control unit 12 via the first supply path 13 into the first subsystem 31, i.e. in direction of the first voltage supply source 311.

This separating function of the separating device 123 for example can be realized by means of a diode 1321, whose anode terminal 1321-1 for example receives the first supply voltage provided by the first voltage supply source 311 via the first supply contact 16a. Downstream of the diode 1321 a voltage converter 131 can be provided. For example, an input 131-1 of the voltage converter 131 is connected with a cathode terminal 1321-2 of the diode 1321.

The voltage converter 131 can be formed to convert the first supply voltage provided by the first voltage supply source 311 into an operating voltage for the control unit 12 and to provide this operating voltage at an output 131-2, which is supplied to the first supply port 122 of the control unit 12. The first supply voltage for example is 12 V, wherein it is a matter of course that said diode 1321 can cause a slight voltage drop, for example about 0.7 V. Even such a reduced voltage substantially still corresponds to the first supply voltage which the first voltage supply source 311 has provided. The voltage converter 131 for example can comprise a DC/DC converter. In particular, the voltage converter 131 can be connected to the first ground terminal 326. The corresponding connecting line in turn can lead over the second ground contact 17b.

In particular, the diode 1321 can form a reverse polarity protection for the communication circuitry of the first subsystem 31.

To further improve the electromagnetic compatibility (EMC) of the control device 1, a filter arrangement 19 can be provided, as it is schematically shown in more detail in FIG. 2. The filter device 19 can wholly or partly be arranged inside or outside the housing 15 of the control device 1.

The filter device 19 comprises a filter voltage terminal 191 and a filter ground terminal 192. In the example corresponding to FIG. 2, the filter ground terminal 192 is connected to the second ground contact 17b and hence is directly connected with the second ground terminal 326. On the other hand, the filter voltage terminal 191 is connected to the first supply contact 16a and hence is directly connected with the first voltage supply source 311. Consequently, the filter device 19 represents a filtering coupling between the first subsystem 31 and the second subsystem 32.

The filter device for example is formed to attenuate HF interferences between the first subsystem 31 and the second subsystem 32, which can have been induced by a HF source 10 of the control device. The HF source 10 of the control device 1 for example comprises said motor 322, said inverter 323, said driver 324 and/or the control unit 12. In particular the inverter 323, which for example is formed to provide a power signal for the motor 322 at a high switching frequency of several Kilohertz, can produce HF interferences which can negatively influence the operation of the control device 1. To avoid or at least limit such influence, said filter device 19 is provided.

In particular, the filter device 19 can comprise a capacitor 193 whose first electrode terminal 193-1 can be connected with the second ground contact 17b and whose second electrode terminal 193-2 can be connected with the first supply contact 16a. In addition, a coil 194 can be provided, which can be connected in series with the capacitor 193.

To further improve the EMC properties of the control device 1, further capacitors 195 and 196 can be provided, wherein a first electrode terminal 195-1 of the capacitor 195 is connected with the first supply contact 16a and a second electrode terminal 195-2 is connected with the first ground contact 17a. Analogously, the further capacitor 196 can be provided, whose first electrode terminal 196-1 is connected with the second supply contact 16b and whose second electrode terminal 196-2 is connected with the second ground contact 17b.

Further optional features of the control device 1 will be set forth below:

The control unit 12 for example controls the driver 324 and for these purposes provides driver control signals at a second signal output 12-1, which signals can be received by the driver 324. The driver 324 for example is supplied with energy by the second voltage supply source 321, wherein in the corresponding supply path a filter 325 can be provided, in particular a PI filter. The driver 324 can be formed to output inverter control signals in dependence on the driver control signals and provide the same to the inverter 323.

The inverter 323 for example likewise is supplied with energy by the second voltage supply source 321. The inverter 323 for example can be formed to convert the second supply voltage into a power signal and supply the power signal to the motor 322. For example, the inverter 323 can be formed to convert the second supply voltage provided by the second voltage supply source 321 into an alternating voltage, for example into a single- or multi-phase alternating voltage. The motor 322 for example can be used to operate a movable component of the vehicle in which the multi-voltage vehicle electrical system 3 is installed, for example an adjustable seat, a liftgate, a window and/or a drive for moving the vehicle itself. The inverter 323 in particular can be connected with the second ground contact 17b via a measuring means 320, wherein the measuring means 320 for example can comprise a measuring resistor (shunt). In addition, the control unit 12 and/or the inverter 324 likewise can be connected with the measuring means 320.

The control device 1 furthermore can comprise said control signal path 14 which couples the first signal output 11-1 of the transceiver 11 to the second signal input 12-2 of the control unit 12. The transceiver 11 and the control unit 12 thus are operatively coupled to each other via the control signal path 14. Via the control signal path 14, which can comprise several partial paths, the transceiver 11 can provide control signals to the control unit 12 and on the other hand the control unit 12 can provide control signals to the transceiver 11 for forwarding into the first subsystem 31. For example, said partial paths each are formed as unidirectional signal paths which allow the transmission of control signals only in one direction.

The control signal path 14 can be formed to transmit a first control signal provided by the transceiver 11 at the first signal output 11-1 to the second signal input 12-2 of the control unit 12.

The control signal path 14 can comprise a further separating device 141 which is connected both to the first ground terminal 316 and to the second ground terminal 326, as it is schematically illustrated in FIG. 1.

In particular, the further separating device 141 can be formed to assume a blocking condition in response to a faulty operating voltage supply in the first subsystem 31 and/or in the second subsystem 32, in which the transmission of the control signal from the first signal output 11-1 to the second signal input 12-2 via the control signal path 14 is inhibited.

The faulty operating voltage supply for example exists when at least one of the following applies: The transceiver 11 no longer is connected to ground; the control unit 12 no longer is connected to ground; a short circuit in the first subsystem 31 and/or in the second subsystem 32; or a potential difference between the first ground terminal 316 and the second ground terminal 326 exceeds a threshold value. The first two faults occasionally also are referred to as ground interruption or ground loss. The ground interruption for example can occur due to a rupture in a plug and/or due to a out cable. Said threshold value for example is +/−1 V. Such fault also is referred to as ground offset. The amount of the threshold value at which the further separating device 141 assumes a blocking condition can be defined for example by correspondingly dimensioning the components of the further separating device 141.

Concrete examples for realizing the circuitry of the further separating device 141 are indicated in the document DE 10 2013 012 615, in particular in FIGS. 2 to 6, to which reference is made herewith expressly. Further examples for realizing the circuitry of the further separating device 141 are indicated in the not yet published application DE 10 2014 221 672, in particular in FIG. 2 to FIG. 4 as well as in the non-published application DE 10 2015 201 572, in particular in FIGS. 2 to 4. Reference also is made herewith expressly to these exemplary embodiments. Consequently, the further separating device 141 of the control device 1 can be designed as it is described by way of example in the above three applications.

Above, reference always has been made to the known 12 V/48 V multi-voltage electrical system of a vehicle as an example for a multi-voltage vehicle electrical system. The present invention, however, is of course not limited to such multi-voltage vehicle electrical systems. Rather, voltage levels other than the 12 V level or the 48 V level also can be employed.

LIST OF REFERENCE NUMERALS 1 control device
10 HF source
11 transceiver 11-1 first signal output
11-2 first signal input
111 second ground port
112 second supply port
12 control unit
12-1 second signal output
12-2 second signal input
121 first ground port
122 first supply port
13 first supply path
131 voltage converter
132 separating device
1321 diode
1321-1 cathode terminal of the diode
1321-2 anode terminal of the first diode
14 control signal path
141 further separating device
15 housing
16a first supply contact
16b second supply contact
17a first ground contact
17b second ground contact
18 communication signal contact(s)
19 filter device
191 filter voltage terminal
192 filter ground terminal
193 capacitor
193-1 first electrode terminal
193-2 second electrode terminal
194 coil
195 further capacitor
195-1 first electrode terminal
195-2 second electrode terminal
196 still further capacitor
196-1 first electrode terminal
196-2 second electrode terminal
3 multi-voltage vehicle electrical system
31 first subsystem
311 first voltage supply source
312 communication component of the first subsystem
316 first ground terminal
32 second subsystem
320 measuring means
321 second voltage supply source
322 electric motor
323 inverter
324 driver
325 filter
326 second ground terminal

The invention claimed is:

1. A control device for a multi-voltage electrical system of a vehicle, wherein the multi-voltage vehicle electrical system includes a first subsystem which is formed to be operated by a first voltage supply source with a first supply voltage, and a second subsystem which is formed to be operated by a second voltage supply source with a second supply voltage, wherein the second supply voltage is greater than the first supply voltage; the control device comprising:
a transceiver which is connected to ground via a first ground terminal of the first subsystem and is supplied with energy at least by the first voltage supply source, and which is formed to communicate with a communication component of the first subsystem;
a control unit which is connected to ground via a second ground terminal of the second subsystem, and which is formed to control a power component of the second subsystem, wherein the first ground terminal of the first subsystem and the second ground terminal of the second subsystem are separate from each other;
wherein the control unit is supplied with energy at least by the first voltage supply source.

2. The control device according to claim 1, wherein the control unit comprises a microcontroller.

3. The control device according to claim 1, wherein the control unit comprises a first ground port which is connected to the second ground terminal.

4. The control device according to claim 1, wherein the control unit comprises a first supply port which is connected with the first voltage supply source via a first supply path.

5. The control device according to claim 4, wherein the first supply path comprises a voltage converter which is formed to receive the first supply voltage and convert the same into an operating voltage for the control unit and to provide the operating voltage at the first supply port of the control unit.

6. The control device according to claim 5, wherein the voltage converter is connected to the second ground terminal.

7. The control device according to claim 4, wherein the first supply path comprises a diode.

8. The control device according to claim 7, wherein an anode terminal of the diode receives the first supply voltage.

9. The control device according to claim 7, wherein the first supply path comprises a separating device, wherein the separating device is formed to block a current flow in the first supply path at least in one flow direction, and wherein the separating device comprises the diode.

10. The control device according to claim 4, wherein the first supply path comprises a separating device, wherein the separating device is formed to block a current flow in the first supply path at least in one flow direction.

11. The control device according to claim 1, wherein the control device comprises:
a first supply contact for receiving the first supply voltage;
a second supply contact for receiving the second supply voltage;
a first ground contact which is connected with the first ground terminal;
a second ground contact which is connected with the second ground terminal.

12. The control device according to claim 11, wherein the control unit comprises a filter device, wherein the filter device
is connected to the first supply contact via a filter voltage terminal and is connected to the second ground contact via a filter ground terminal; or
is connected to the second supply contact via the filter voltage terminal and is connected to the first ground contact via a filter ground terminal.

13. The control device according to claim 12, wherein the filter device is formed to attenuate HF interferences between the first subsystem and the second subsystem, which have been induced by a HF source of the control device.

14. A control device for a multi-voltage electrical system of a vehicle, wherein the multi-voltage vehicle electrical system includes a first subsystem which is formed to be operated by a first voltage supply source with a first supply voltage, and a second subsystem which is formed to be operated by a second voltage supply source with a second supply voltage; the control device comprising:
a transceiver which is connected to ground via a first ground terminal of the first subsystem and is supplied with energy at least by the first voltage supply source, and which is formed to communicate with a communication component of the first subsystem;

a control unit which is connected to ground via a second ground terminal of the second subsystem, and which is formed to control a power component of the second subsystem;

a first supply contact for receiving the first supply voltage; a second supply contact for receiving the second supply voltage; a first ground contact which is connected with the first ground terminal; and a second ground contact which is connected with the second ground terminal;

wherein the control device comprises a filter device, wherein the filter device is connected to the first supply contact via a filter voltage terminal and is connected to the second ground contact via a filter ground terminal; or is connected to the second supply contact via a filter voltage terminal and is connected to the first ground contact via a filter ground terminal.

15. The control device according to claim 14, wherein the filter device is formed to attenuate HF interferences between the first subsystem and the second subsystem, which have been induced by a HF source of the control device.

* * * * *